United States Patent [19]
Burian et al.

[11] Patent Number: 6,076,471
[45] Date of Patent: Jun. 20, 2000

[54] TANK CAR MANWAY COVER ASSEMBLY

[76] Inventors: William F. Burian, 5321 Webster St., Downers Grove, Ill. 60515; Alex V. Degutis, 1221 Beacon St., East Chicago, Ind. 46312; Michael S. Ryan, 1130 79$^{th}$ St., Darien, Ill. 60561; Stanley A. Brzezniak, 5429 S. Luna Ave., Chicago, Ill. 60638

[21] Appl. No.: 09/162,060

[22] Filed: Sep. 28, 1998

[51] Int. Cl.$^7$ .................................................. B61D 39/00
[52] U.S. Cl. ................ 105/377.07; 105/358; 105/377.01
[58] Field of Search .................................. 105/358, 377, 105/377.01, 377.07; 137/43; 220/22

[56] References Cited

U.S. PATENT DOCUMENTS

| | | | |
|---|---|---|---|
| 3,786,955 | 1/1974 | Mowatt-Larssen | 105/358 |
| 4,126,151 | 11/1978 | Bullerdiek | 137/43 |
| 4,210,254 | 7/1980 | Parsons et al. | 220/22 |
| 4,318,348 | 3/1982 | Parsons et al. | 105/358 |
| 4,655,365 | 4/1987 | Miller | 105/377 |
| 4,819,830 | 4/1989 | Schultz | 105/377 |
| 5,158,022 | 10/1992 | Dugge et al. | 105/377 |
| 5,622,117 | 4/1997 | Burian et al. | 105/377.07 |
| 5,678,827 | 10/1997 | Burian et al. | 105/377.07 |
| 5,785,078 | 7/1998 | Burian et al. | 105/358 |
| 5,813,352 | 9/1998 | Bramlett et al. | 105/377.07 |

*Primary Examiner*—S. Joseph Morano
*Assistant Examiner*—Louis A. Olson
*Attorney, Agent, or Firm*—McEachran, Jambor, Keating, Bock & Kurtz

[57] ABSTRACT

A manway cover assembly to cover an opening of a tank car, defined by an upstanding manway nozzle. The manway cover assembly comprises a manway cover housing, a safety vent and a manway nozzle gasket. The safety vent includes a body mounted on the manway cover housing. The safety vent further includes a surge protector and a rupture disk. The rupture disk is designed to open at a known pressure and allow controlled venting of the pressure in the car. The manway cover housing defines a bore which contains the surge protector of the safety vent. The manway cover housing includes a tube extending downwardly and surrounding the surge protector.

8 Claims, 6 Drawing Sheets

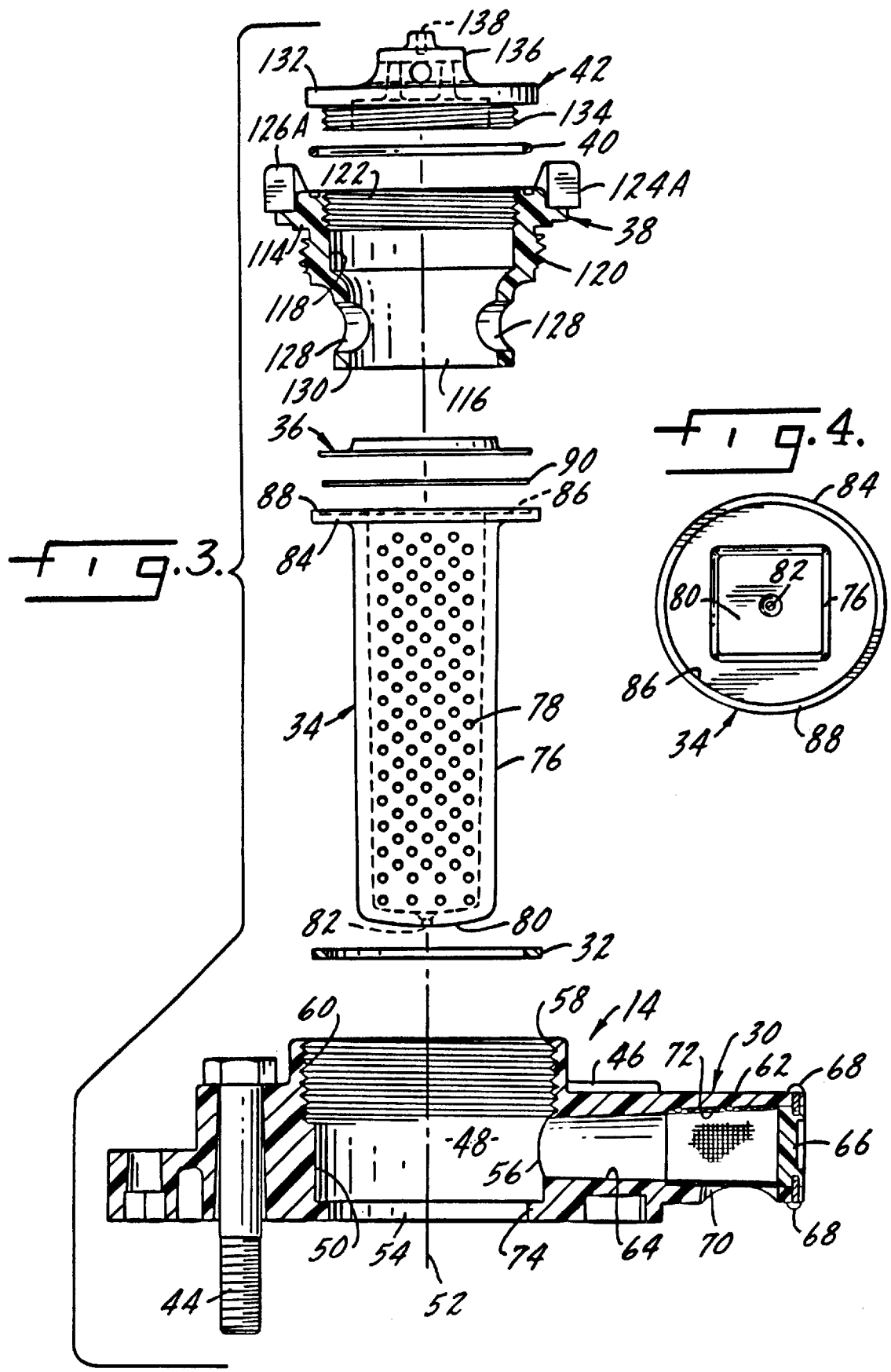

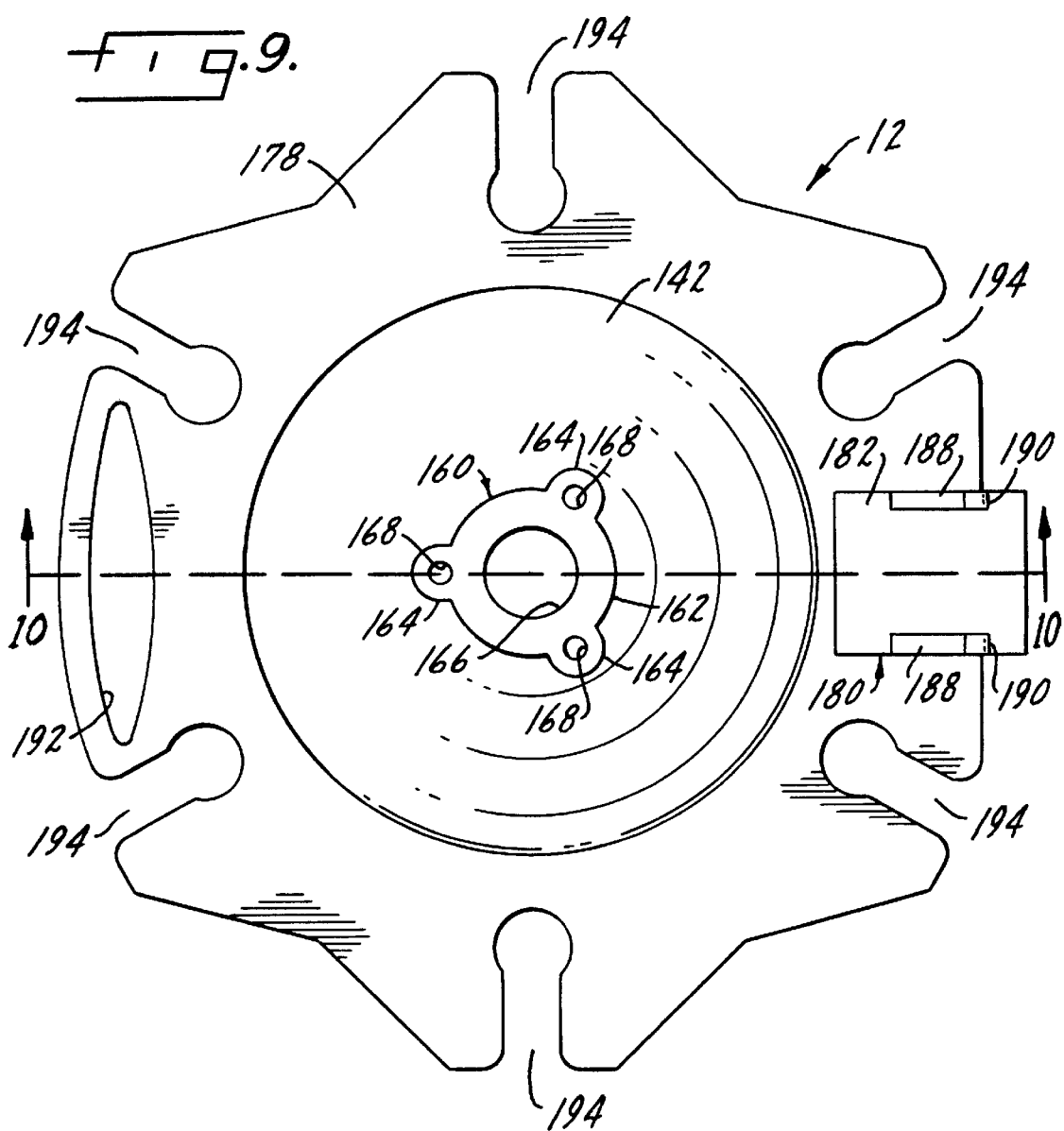
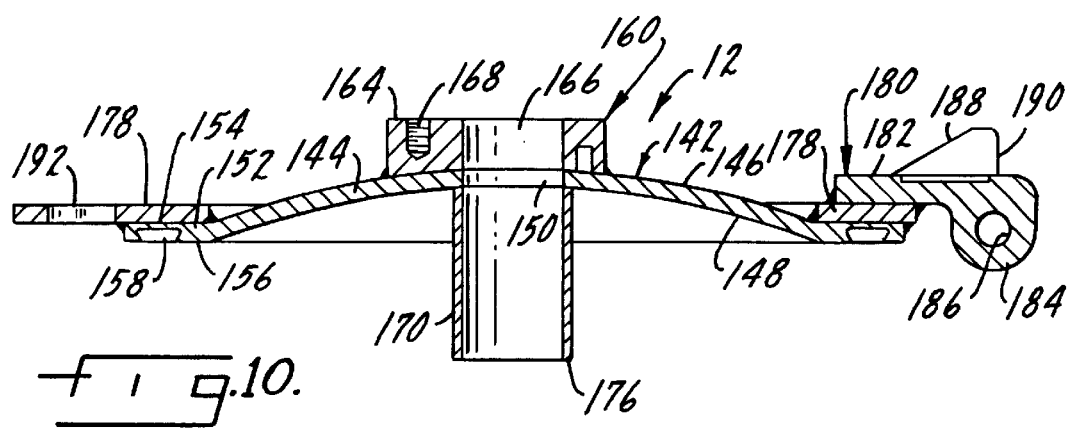

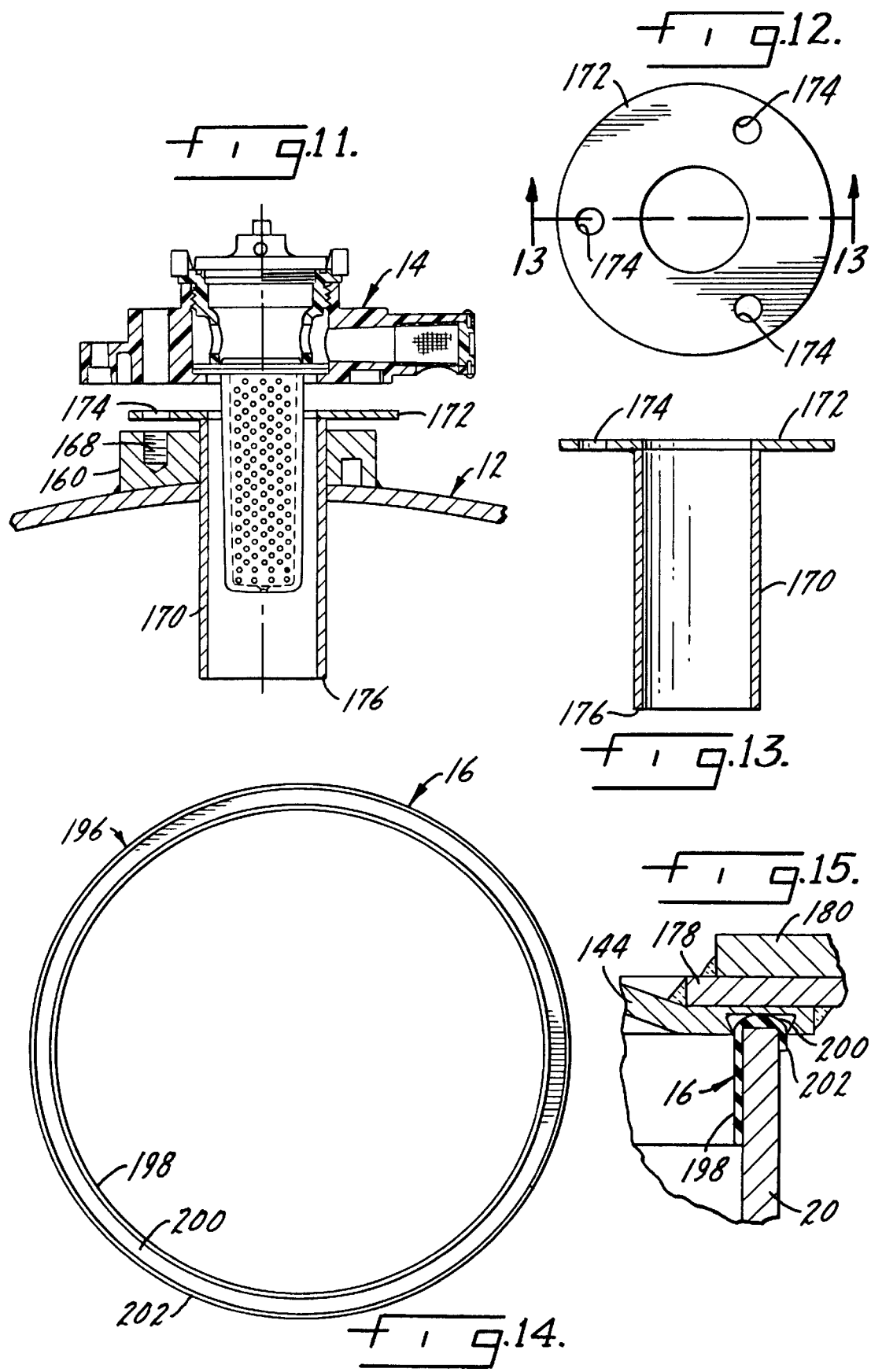

TANK CAR MANWAY COVER ASSEMBLY

BACKGROUND OF THE INVENTION

Railroad tank cars are required to be equipped with a pressure relief device which will open in the event of a major pressure surge in the car. The purpose of the relief device is to open and vent major pressure surges in a controlled manner rather than risk damage to the tank car body or a catastrophic release of pressure. Major pressure surges, also sometimes known as hydraulic hammer, can be caused by sudden, abnormal shifting of the liquid contents of a car due to improper car handling, emergency braking or the like. The car body and relief device are designed to withstand minor pressure surges caused by normal car handling and movement. Shifting or sloshing of the liquid contents occurs because the tank cars are not permitted to be filled fully. Thus, there is some open space at the top of the car body, allowing for movement of the liquid within the car, which can compress the air (or other gas) at the top of the car and create a pressure surge.

A safety vent for a railroad tank car mounted about an opening on the top of the car is taught by Burian in U.S. Pat. No. 5,785,078 assigned to the present assignee. The housing body of the safety vent defines a cavity which contains a surge protector and a rupture disk. The rupture disk is designed to open at known pressure and allows controlled venting of the pressure in the car. A securement cap threaded into the cavity entraps the rupture disk in a seat formed in the surge protector. Removal of the securement cap provides quick, easy access to the rupture disk and surge protector for inspection and replacement without removing the safety vent housing body.

The present invention represents a refinement in the development of manway cover assembly by mounting a safety vent of the type taught in U.S. Pat. No. 5,785,078 on the top of a manway cover housing while providing means to protect the safety vent and allowing optimal operation of the safety vent.

SUMMARY OF THE INVENTION

The present invention relates to a manway cover assembly for a railroad tank car which comprises a manway cover housing, safety vent and a manway nozzle gasket. One of the objects of the invention is to provide a manway cover assembly which allows the optimal operation of the safety vent.

Another object of the invention is to provide means for preventing damage to the safety vent while installed in the manway cover housing.

A manway cover assembly engageable with the manway nozzle of a railroad tank car comprises a housing, a safety vent and a tube. The housing, connectable to the tank car, has a top surface, a bottom surface and a cavity therein. The safety vent, disposed in the cavity of the housing, substantially blocks the fluid flow path under normal service conditions while permitting flow from the inside of the tank car to the outside of the tank car under abnormal pressure surge conditions. The tube, connected to the housing, extends downwardly toward the tank car and surrounds the surge protector.

BRIEF DESCRIPTION OF THE INVENTION

FIG. 3 is an exploded section taken along line 3—3 of FIG. 2.

FIG. 4 is a top plan view of the surge protector portion of the safety vent.

FIG. 9 is a top plan view of the manway cover housing.

FIG. 10 is a section taken along line 10—10 of FIG. 9.

FIG. 11 is an exploded section of a safety vent and an alternative tube.

FIG. 12 is a top plan view of the alternative tube.

FIG. 13 is a section taken along line 13—13 of FIG. 12.

FIG. 14 is a bottom plan view of the gasket.

FIG. 15 is a section taken through the gasket as installed on a manway nozzle with a portion of a manway cover housing closed on the gasket.

DETAILED DESCRIPTION OF THE INVENTION

Figure 1:
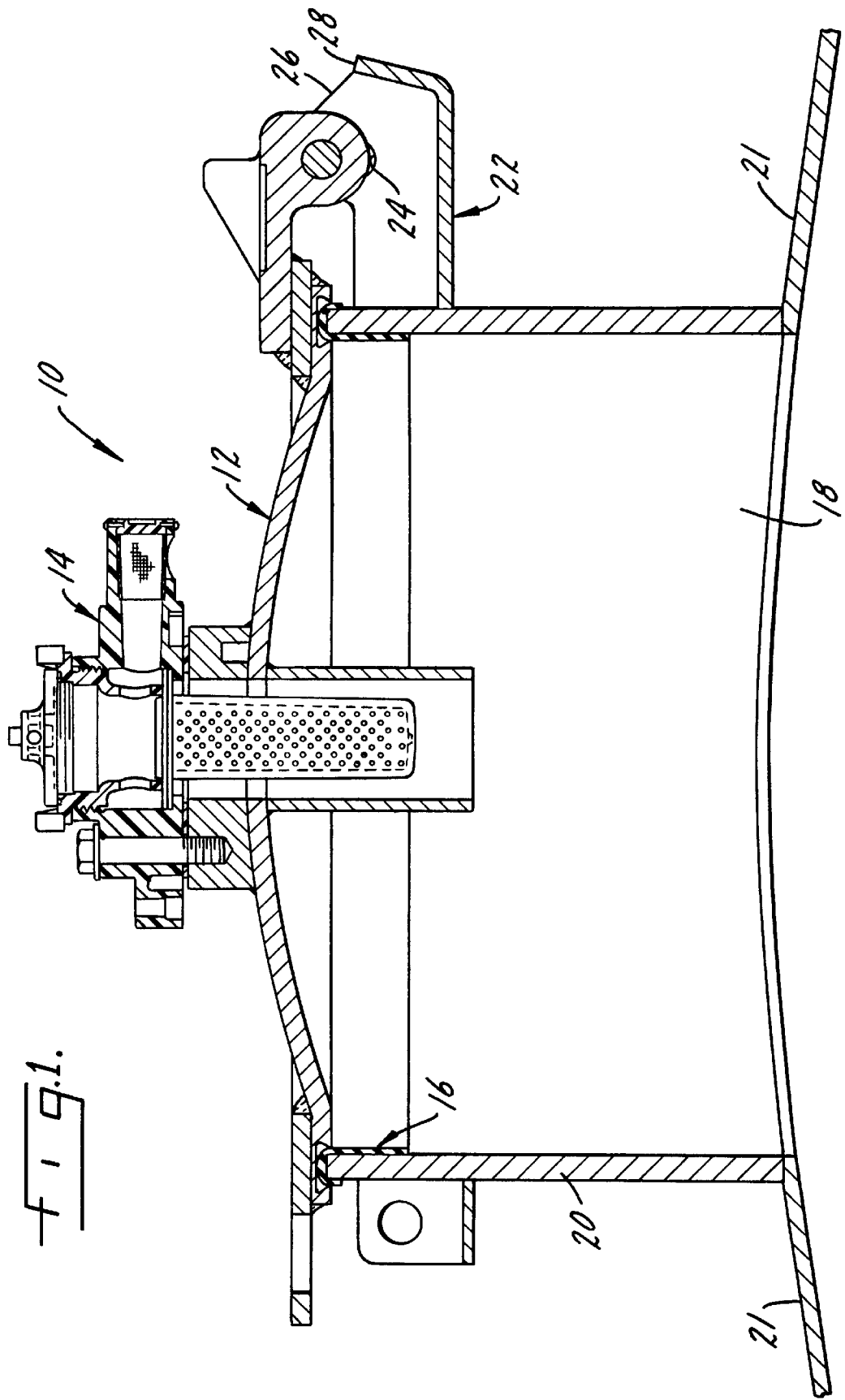
FIG. 1 is section taken through the manway cover assembly as mounted on the manway nozzle.

The manway cover assembly 10 of the present invention comprises a manway cover housing 12, a safety vent 14 removably attached to the manway cover housing 12 and a manway nozzle gasket 16. The manway cover housing 12 covers the opening 18 of a manway nozzle 20 on the top of a railroad tank car 21 to separate the inside of the tank car from the outside of the tank car. The manway nozzle 20 allows a person to enter into the tank car. Entering the tank car is sometimes necessary for inspecting, cleaning or repairing the tank car. Attached to one side of the manway nozzle 20 is a pivot arm 22 having a pivot hole 24 at the terminal end 26. Pivot arm 22 further has a stop surface 28 spaced from the pivot hole 24. The function of the stop surface 28 will be discussed later.

Figure 2:
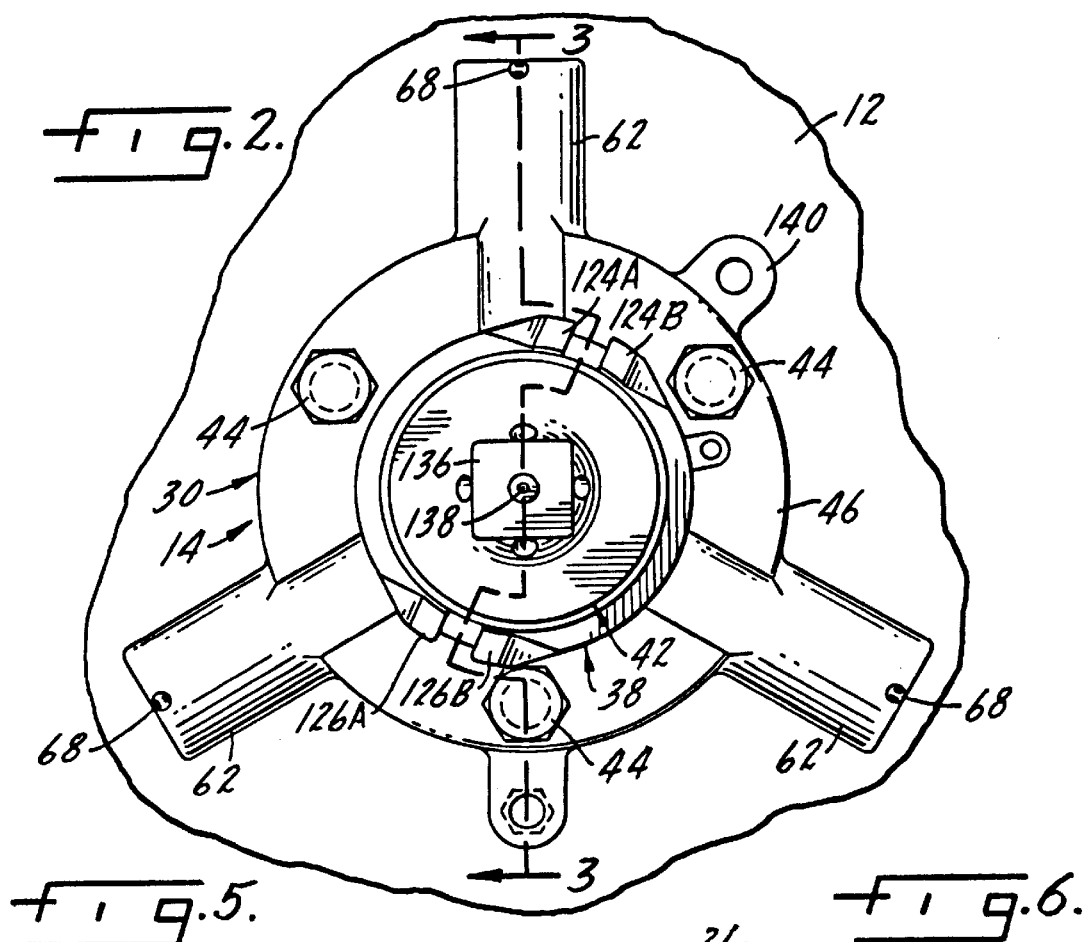
FIG. 2 is a top plan view of the safety vent.

The safety vent 14 is shown in FIGS. 1, 2 and 3. As best seen in FIG. 3, the safety vent 14 includes a housing 30, a gasket 32, a surge protector 34, a rupture disk 36, a securement cap 38, an O-ring 40, and a top cap 42.

The safety vent housing 30 is connectable to the manway cover housing 12. Bolts 44 are provided for the purpose of fastening the safety vent housing 30 to the manway cover housing 12.

The safety vent housing 30 includes a body 46 which has a central cavity 48 defined by sidewall 50 extending therethrough. The cavity 48 is a generally cylindrical passage through the body along the axis shown at 52. The cavity 48 has an inlet 54 at the bottom portion of the body and at least one outlet 56 through the sidewall 50 of the body. The body 46 also defines an access port 58 near the upper end of the cavity 48. The sidewall 50 of the body is threaded near the access port 58 as shown at 60.

The housing further includes three equally-spaced arms 62 extending from the body 46. Each arm 62 has an internal passage 64 extending from an outlet 56 to an open outer end which is closed off by a plug 66. The plugs are retained by set screws 68. Apertures 70 formed in the underside of the arms 62 allow fluid to escape from the passages 64. Stainless steel screens 72 may be provided in the ends of the arms to prevent entry of insects, dirt or contaminants through the ports 70.

A retention means 74 is formed near the bottom of the cavity 48. In the preferred embodiment, the retention means takes the form of a shoulder extending around the inlet 54. It will be understood that other forms of retention means could be used. The retention means is sized such that the gasket 32 will rest on the upper surface of the shoulder Looking now at FIGS. 3 and 4, details of the surge protector 34 will be described. The surge protector is generally an elongated hollow perforate member. In the illustrated embodiment, there is a generally rectangular tube 76 with a plurality of holes 78 in at least two of the four walls of the tube section 76. The distal end of tube 76 is closed by a bottom wall 80. An opening 82 is formed in the bottom wall. A flange 84 is attached to the upper end of the tube 76. The flange 84 is generally circular and has an outside diameter just slightly less than the inside diameter of the cavity 48. Thus, the flange 84 is arranged to rest on the top surface of the gasket 32 where it is supported by the shoulder 74 of the housing 30. The upper surface of the flange 84 has a seat 86 formed therein. The seat is in the form of an indentation or recess in the flange which defines a rim 88 extending around the periphery of the flange. The rupture disk 36 is sized to fit into the seat 86 and be held by the rim 88. A thin gasket 90 (FIG. 3) may be placed in the seat 86 between the disk 36 and the flange 84.

Figures 5, 6, 7:
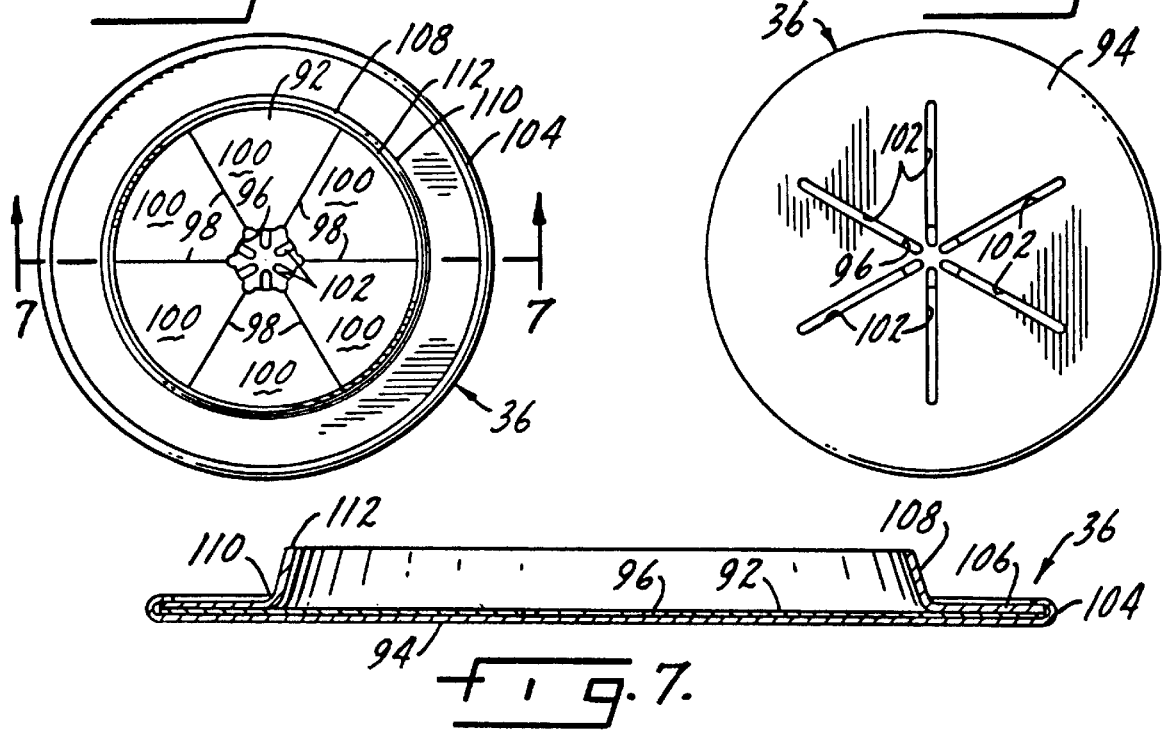
FIG. 5 is a top plan view of the rupture disk.
FIG. 6 is a bottom plan view of the rupture disk.
FIG. 7 is an enlarged section taken along line 7—7 of FIG. 5.

Details of the rupture disk 36 are shown in FIGS. 5–7. The rupture disk comprises a generally planar plate and an upstanding annular wall. The plate is formed of upper and lower layers 92 and 94. Upper layer 92 is a disk-shaped member having a central cutout portion 96 (FIG. 5). Radial slits 98 extend from cutout 96 to define a plurality of segments 100. The lower layer 94 of the rupture disk plate has a plurality of radial slots 102. As can be seen in FIG. 6 the slots 102 are angularly displaced from the slits 98 such that the slots 102 underlie the center of the segments 100. The edges of the bottom layer 94 are turned over as at 104 and crimped against the outer portion of the wall to sandwich the upper layer 92 between the wall and lower layer 94, as best seen in FIG. 7. The wall 106 has an upstanding portion 108 which is tapered such that the proximal end 110 adjacent the plate layer 92 has a greater diameter than the distal end 112 of the upstanding portion 108. Preferably the rupture disk is made of stainless steel.

Figure 8:
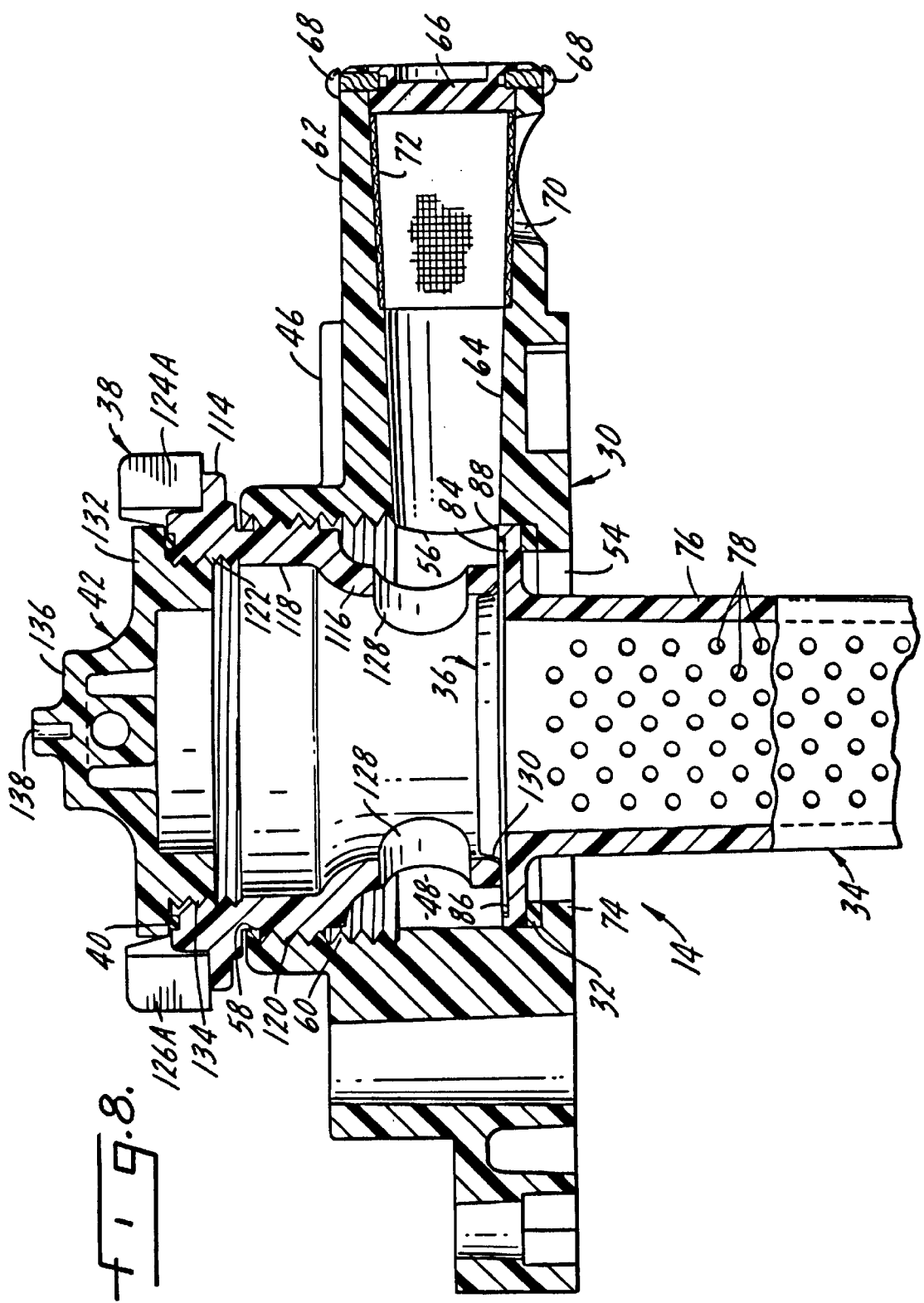
FIG. 8 is a section similar to FIG. 3, showing the parts of safety vent in an assembly.

Turning now to FIGS. 3 and 8, the securement cap 38 includes a collar 114 and a depending, annular skirt 116. The securement cap has a bore 118 extending therethrough. The collar has exterior threads 120 and interior threads 122. Threads 120 mate with the threads 60 in the housing body to permit the securement cap 38 to be removably engageable with the housing 30. The collar 114 includes two pairs of lugs 124A, 124B and 126A, 126B. The lugs define a space between them which can receive a tool for turning the securement cap into and out of the housing. The skirt portion 116 has at least two openings 128 for permitting flow out of the bore 118.

The skirt 116 further includes centering means for locating the rupture disk 36 on the seat 86 of the surge protector 32. The centering means comprises a radiused annular surface 130 formed at the free end of the skirt. The radiused surface has a diameter intermediate the proximal and distal diameters of the wall 108. Thus, the radiused surface 130 contacts the upstanding portion 108 of the wall 106 to interfit therewith in centering relation. This is best seen in FIG. 8.

The top cap 42 has a plate-like member 132 with threads 134 depending therefrom. Threads 134 of the top cap engage threads 122 of the securement cap to hold the top cap 42 in place. A central crown 136 on the top cap enables easier gripping for removal from the securement cap. A screw hole 138 can be used to secure a retention strap or the like (not shown) connected to a lug 140 (FIG. 2) to prevent loss of the top cap. The O-ring 40 fits between the member 132 and the collar 114 to prevent leakage out of the top cap.

The use, operation and function of the invention are as follows. When the safety vent is installed as shown in FIG. 8, the housing 30 is sealed against the manway cover housing 12. The manway cover housing 12 is in communication with the inlet 54 of the cavity 48. The gasket 32 prevents flow around the outside of the surge protector 34. Fluid flow must go through the apertures 78 in the surge protector to the interior of the tube 76. Flow from tube 76 into the interior of the securement cap 38 is normally prevented by the rupture disk 36. Hence, under normal service conditions the rupture disk 36 restricts or blocks the flow of fluid from tube 76 to the interior of securement cap 38. However, in the case of a major pressure surge, the pressure may burst the layers 92, 94 of the rupture disk and permit flow into the interior of the securement cap 38. From there fluid may flow through openings 128 in the skirt 116 and into the cavity 48. Fluid may exit the cavity through the outlets 56 into the arm passages 64 and out the downwardly directed ports 70. Thus, pressure is released in a controlled manner through the arms 62 of the safety vent 14.

Quick and easy inspection of the rupture disk can be had by simply unscrewing the top cap 42. The rupture disk 36 is visible through the hollow interior of the securement cap 38. If the rupture disk has burst as described above, the securement cap 38 is unscrewed from the access port 58 of the body 46. The spent rupture disk can then be removed from the seat 86 of the surge protector 34. A new one is dropped into place on the seat. Replacement of the securement cap will cause the radiused surface 130 to engage the wall 108 of the new rupture disk and center it in proper position. Once the securement cap is back in place, the top cap 42 is also put back into its position on top of the securement cap if it had been removed.

It can also be appreciated that inspection and/or replacement of the surge protector 32 is also readily accomplished by removing the securement cap 38 from the housing 30. The surge protector can be lifted off of the shoulder 74 and pulled out of the cavity 48 through the access port 58. The cleaned or new surge protector is then dropped in through the access port such that flange 84 engages shoulder 74 to hold the surge protector in position as seen in FIG. 8.

The manway cover housing 12 is shown in FIGS. 9 and 10. The manway cover housing 12 includes a circular body 142, a boss 160, a tube 170, an attachment body 178 and a hinge bracket 180. The radially inner portion 144 of the circular body 142 has a domed surface such that the upper surface 146 of the inner circular body 144 has a convex surface and the lower surface 148 of the inner circular body 144 has a concave surface. The center of the inner circular body 144 defines a hole 150 through which the surge protector 34 is inserted.

The radially outer portion 152 of the circular body 142 has a flat portion having an upper surface 154 and a lower surface 156. The lower surface 156 of the outer circular body 152 has a circular groove 158 to receive a gasket installed on the manway nozzle. To assure proper alignment of the circular groove 158 with the gasket on the manway nozzle 20, the centerline diameter of groove 158 should be approximately the same as the centerline diameter of the manway nozzle 20.

Attached to the upper surface 146 of the circular body 142 is a boss 160 for attachment of the safety vent 14 to the manway cover housing 12. The boss 160 has a mainly circular boss body 162 with three equally spaced lobes 164 extending from the boss body. The boss 160 further has a bore 166 defined in the center of the boss. Diameter of the bore 166 of the boss is approximately the same diameter as the hole 150 of the circular body. Once boss 160 is attached to the circular body 142, bore 166 and hole 150 form a single cavity, in the center of manway cover housing 12, which the surge protector 34 is inserted. Each of the lobes 164 of the boss defines a threaded hole 168 for receiving bolts 44 (FIG. 3) to secure the safety vent housing 30 to the manway cover housing 12.

Extending from the lower surface of the circular body is a tube 170 surrounding the surge protector 34 when the safety vent 14 is installed on the manway cover housing 12. The tube 170 can be attached to the circular body by welding one end of the tube to the lower surface 148 of the inner circular body 144. Alternatively, the tube 170 can be inserted into the circular body 142 from the upper surface 146 of the circular body as illustrated in FIG. 11. In this embodiment, the tube 170 has a circular flange 172 attached to one end. The circular flange 172 has holes 174 sized and located to correspond with bolt holes 168 of boss 160. The flange 172 is positioned between boss 160 and safety vent 14 with the non-flanged end of tube facing downwardly. This embodiment allows the tube 170 to be removed simply by removing bolts 44 and safety vent 14; thus it allows for easy replacement of tube 170 should the tube be damaged during use.

In either embodiment, the terminal end 176 of tube 170 extends beyond the bottom wall 80 of the surge protector 34 such that the entire length of the surge protector 34 is enclosed in the tube. Tube 170 serves several purposes. First tube 170 protects the surge protector 34 from physical damage. When the manway cover is open, without tube 170 present, the surge protector 34 would be exposed. Since the surge protector 34 is relatively fragile compared with the rough activities associated with the loading of liquid into the tank car, the surge protector 34 would be prone to physical damage if tube 170 was not present.

Another advantage of the tube 170 is that it allows the safety vent 14 to react solely to the pressure in the tank car. During sudden acceleration or deceleration of the tank car, the liquid contents of tank car would slosh within the tank. The effect of this sloshing is even more evident in the manway nozzle area of the tank car due to the small confines of the manway nozzle. The liquid shifting from one side of the tank to the other side would hit against the side of the manway nozzle causing the liquid contents to splash back and forth within the manway nozzle. This splashing of the liquid causes the liquid to move not only in a vertical direction within the tank car but also in a horizontal direction. Without the tube 170 surrounding the surge protector 34, the liquid would strike the side of the surge protector 34 at a high velocity causing the safety vent 14 to react as if the pressure is higher than the actual pressure in the car. This false pressure reaction could cause the rupture disk 36 to rupture prematurely. The tube 170 prevents the liquid from striking the side surge protector 34, thus allowing the safety vent 14 to react only to the pressure in the car.

A third advantage of the tube 170 is that it reduces the amount of liquid which would be expelled from the safety vent 14 should the rupture disk 36 rupture. As discussed earlier, without the tube 170 surrounding the surge protector 34, liquid sloshing in the tank car would strike the surge protector 34. Thereafter, a certain amount of the liquid would remain on the surge protector 34 or be trapped within the surge protector 34. In an ideal situation, when the pressure in the tank car is sufficient to rupture the rupture disk 36, the air occupying the area above the fluid line would first be released through passage 46 of safety vent 34, thus reducing the amount of liquid that is expelled. Only after all the air has been released will liquid be released through passage 46. Without tube 170 surrounding the surge protector 34, the liquid on the surge protector 34 and the liquid trapped within the surge protector 34 would be expelled along with the air. This expulsion of the liquid along with the air is particularly problematic when the liquid contents are toxic.

Attached to the upper surface of the outer circular body 154 is attachment body 178. Attached to one end of the attachment body 178 is a hinge bracket 180. The hinge bracket 180 has a flat body 182 at one end and a hinge 184 at the other end. The hinge 184 has a bore 186 therein to receive a pivot pin (not shown) for retaining the manway cover housing 12 to the manway nozzle 20. The hinge 184 allows the manway cover housing 12 to pivot along the axis of the pivot bolt inserted through pivot hole 24 of pivot arm 22 and bore 186 of hinge bracket 180. This allows the manway cover housing 12 to be opened without disconnecting the manway cover housing 12 from the manway nozzle 20. The bottom surface of the flat body 182 of the hinge bracket 180 is attached to the attachment body 178.

The hinge bracket 180 further comprises two parallel tabs 188 extending perpendicularly from the top of the flat body 180. Each tab 188 has an abutment surface 190 facing away from the center of the manway cover housing 12 and toward the hinge 184. Upon opening the manway cover housing 12, the abutment surface 190 would abut the stop surface 28 of the pivot arm 22 to limit the amount of pivot of the manway cover housing 12. The degree of pivot, limited by the abutment of the abutment surface 190 and the stop surface 28, should be such that the manway cover housing 12 would remain open. This is normally achieved when the manway cover housing 12 has rotated more than ninety degrees. The degree of pivot, limited by the abutment of the abutment surface 190 and the stop surface 28, should also be such that the exposed portion of the safety vent 14 will not contact the roof of the tank car; thus, significantly reducing the likelihood of damage to the safety vent 14.

One hundred and eighty degrees from the hinge bracket 180, the attachment body 178 defines an oval shaped elongated hole 192. The elongated hole 192 functions as a handle which allows a person to pull on the manway cover housing 12 to pivotably open the manway cover housing 12. The elongated hole 192 should be sized such that a person is able to comfortably put his hand and palm through the opening to get a solid grip on the manway cover housing 12.

The attachment bracket 178 further comprises six equally spaced slots 194 along its outer edge. The terminal end of each slot 194 has a circular surface to receive tie down bolts. The location and the number of slots correspond to the location and the number of tie down bolts for the particular tank car for which the manway cover housing 12 is used.

A gasket for railroad car manways or hatches, mounted on the top of a loading nozzle, is taught by Burian in U.S. Pat. No. 5,678,827 assigned to the present assignee. The present invention incorporates a manway nozzle gasket of the type taught in U.S. Pat. No. 5,678,827. The manway nozzle gasket 16 is shown in FIGS. 14 and 15. The manway nozzle gasket can be either compression molded or injection molded from a variety of commodity sensitive materials such as butyl rubber, Viton (a DuPont trademark), EPDM or white nitrile. A Shore A durometer of about 70–75 is preferred. The gasket is a ring member 196 of an inverted j-shaped cross section formed by a down leg 198, a bail 200 and a short leg 202. The bail joins the legs, preferably at the ends thereof. The legs are separated by a distance approximately equal to the thickness of a manway nozzle 20. Thus, as shown in FIGS. 1 and 15, when the gasket is installed the down leg 198 engages the inside wall of the manway nozzle 20, the underside of the bail 200 rests on the top land of the manway nozzle and the short leg 202 engages the nozzle outer wall.

Details of the gasket are best seen in FIG. 15. The down leg 198 is substantially longer than the short leg 202. This is to provide more part stability when the manway cover housing 12 closes down on the ring member. The down leg also resists the tendency of the gasket to roll or peel off the nozzle. To provide this stability the down leg should be at least about four times as long as the short leg. For reference purposes only, it has been found that a down leg length of 2.0 inches and a short leg length of 0.375 inches (both measured from the bottom of the bail) are acceptable dimensions. The legs are about 0.125 inches thick.

The outside corner of the junction between the down leg 198 and bail 200 has a non-square corner that is important to the effectiveness of the gasket. In effect, the corner has some material removed to avoid interference with closing the manway cover housing 12.

While a preferred form of the invention has been shown and described, it will be realized that alterations and modifications may be made thereto without departing from the scope of the following claims.

What is claimed is:

1. A manway cover assembly engageable with the manway nozzle of a railroad tank car, comprising:

a housing connectable to the tank car, said housing having a top surface, a bottom surface and a cavity therein;

a safety vent attachable to said housing and defining a fluid flow path including an inlet and an outlet, said safety vent having a flow restrictor disposed therein for substantially blocking the fluid flow path under normal service conditions while permitting flow from the inlet to the outlet under abnormal pressure surge conditions, said safety vent further having a surge protector disposed in said cavity of said housing having an elongated member extending downwardly toward the tank car and terminating at a distal end; and a tube connected to said housing, said tube extending downwardly toward the tank car and surrounding said elongated member.

2. The manway cover of claim 1 wherein said tube extends beyond the distal end of said surge protector.

3. The manway cover of claim 1 wherein said tube is mounted on the bottom surface of the housing.

4. The manway cover of claim 1 wherein said tube has a flange at one end and a non-flanged distal end at the other end, said tube being insertable into the cavity of the housing such that said flange end of the tube is situated on the top surface of the housing and said non-flanged distal end of the tube extends downwardly toward the car.

5. The manway cover of claim 1 wherein the housing is generally domed shaped.

6. The manway cover of claim 1 further comprising a gasket for sealing the junction between the manway nozzle and the manway cover housing when closed.

7. The manway cover of claim 6 wherein said gasket is mounted on the manway nozzle.

8. A manway cover assembly engageable with the manway nozzle of a railroad tank car, comprising:

a housing pivotably connectable to the tank car, said housing having a top surface, a bottom surface and a cavity therein;

a safety vent attachable to said housing and defining a fluid flow path including an inlet and an outlet, said safety vent having a flow restrictor disposed therein for substantially blocking the fluid flow path under normal service conditions while permitting flow from the inlet to the outlet under abnormal pressure surge conditions; and a hinge bracket mounted on said housing for pivotably connecting said housing to the tank car, said hinge bracket having at least one tab to limit range of pivoting motion by said housing, said tab extending from top of said hinge bracket.

* * * * *

UNITED STATES PATENT AND TRADEMARK OFFICE
CERTIFICATE OF CORRECTION

PATENT NO. : 6,076,471
DATED : June 20, 2000
INVENTOR(S) : William F. Burian, Alex V. Degutis, Michael S. Ryan, Stanley A. Brzezniak, Charles L. Horne It is certified that error appears in the above-identified patent and that said Letters Patent is hereby corrected as shown below:

<u>Title page,</u>
In the inventor field, after "Stanley A. Brzezniak, 5429 S. Luna Ave., Chicago, ILL. 60638" please insert -- Charles L. Horne, 1500 N. LaSalle Street, #5C, Chicago, ILL. 60610. --.

Signed and Sealed this

Eleventh Day of September, 2001

Attest:

*Nicholas P. Godici*

NICHOLAS P. GODICI
*Attesting Officer*     *Acting Director of the United States Patent and Trademark Office*